United States Patent

Takeno et al.

[11] Patent Number: 5,080,066
[45] Date of Patent: Jan. 14, 1992

[54] METHOD OF CONTROLLING ENGINE

[75] Inventors: Seigo Takeno; Hiroshi Abe; Tsuyoshi Kojima; Yasuo Fujitsuku; Ken Ohtsuki; Masayuki Murata; Yasuhiro Sudo, all of Hiroshima, Japan

[73] Assignee: Mazda Motor Corporation, Hiroshima, Japan

[21] Appl. No.: 677,529

[22] Filed: Mar. 29, 1991

[30] Foreign Application Priority Data

Mar. 30, 1990 [JP] Japan .................................. 2-86203

[51] Int. Cl.$^5$ .............................................. F02P 5/15
[52] U.S. Cl. .................................... 123/406; 123/306; 123/192.1
[58] Field of Search .................... 123/192 R, 406, 419, 123/436, 306

[56] References Cited

U.S. PATENT DOCUMENTS 4,197,767  4/1980  Leung ................................. 123/436
5,016,591  5/1991  Nanyoshi et al. .................. 123/419

FOREIGN PATENT DOCUMENTS 59-22985  2/1984  Japan .

Primary Examiner—Tony M. Argenbright
Attorney, Agent, or Firm—Sixbey, Friedman, Leedom & Ferguson

[57] ABSTRACT

An engine has a crankshaft and a plurality of cylinders arranged in a row in a direction parallel to the crankshaft. Combustion in the cylinder adjacent to each end portion of the crankshaft to suppress bending strain of the crankshaft at said one end portion. The vibration control conditions of controlling combustion in the cylinders adjacent to the respective end portions of the crankshaft are set on the basis of properties of vibration of the engine and resonant frequencies at the respective end portions of the crankshaft and the conditions of combustion in the respective cylinders are controlled on the basis of the vibration control conditions set for the respective cylinders.

6 Claims, 6 Drawing Sheets 5,080,066

METHOD OF CONTROLLING ENGINE

BACKGROUND OF THE INVENTION

1. Field of the Invention

This invention relates to a method of controlling an engine in order to suppress the noise produced by vibration of the engine.

2. Description of the Prior Art

In an engine for a vehicle, generally a flywheel is mounted on the rear end of the crankshaft and a pulley for driving a camshaft and auxiliary mechanisms is mounted on the front end of the crankshaft. In such an engine, bending strain is produced in the end portions of the crankshaft due to the combustion pressure which causes the flywheel and the like to vibrate, whereby noise is produced.

In order to avoid the problem, it has been proposed to lower the combustion pressure in the cylinder on the rear side of the engine adjacent to the flywheel so that the bending strain produced in the rear end portion of the crankshaft is minimized, as disclosed, for instance, in Japanese Unexamined Utility Model Publication No. 59(1984)-22985.

In the prior art, the combustion pressure in the cylinder on the rear side of the engine is lowered without taking into account the properties of engine vibration independently from the operating range of the engine. However, the vibration of the engine itself due to combustion in each cylinder includes a first mode component, a second mode component and higher mode components and has inherent properties depending on the strength distribution of the respective components, the frequency which is governed by the engine speed, and the like. Thus, the level and/or the tone of the noise change according to the operating range of the engine depending on the properties of the vibration of the engine, the resonant frequency of the flywheel and the like. Accordingly, when the combustion pressure in the cylinder on the rear side of the engine is lowered by a relatively small rate, the noise suppressing effect can become insufficient and when the combustion pressure in the cylinder on the rear side of the engine is lowered by a relatively large rate in order to avoid this, an unnecessary output loss of the engine can be caused in an operating range where there is substantially no problem of noise.

Further, the vibration of the pulley produced due to the bending strain in the front end portion of the crankshaft also causes the problem of noise. The attempt to suppress the noise at the front side of the engine encounters the same problem. At the same time, the fact that the resonant frequency at the front side of the engine differs from that the rear side of the engine makes the problem more serious.

SUMMARY OF THE INVENTION

In view of the foregoing observations and description, the primary object of the present invention is to provide a method of controlling the engine which can properly suppress the noise produced by the vibration of the engine to which the properties of the vibration of the engine and the resonant frequencies at the end portions of the engine are related.

In accordance with the present invention, there is provided a method of controlling an engine to suppress vibration of the engine, the engine having a crankshaft and a plurality of cylinders arranged in a row in a direction parallel to the crankshaft, the method comprising the step of controlling the condition of combustion in the cylinder adjacent to one end portion of the crankshaft to suppress bending strain of the crankshaft at said one end portion wherein the improvement comprises that vibration control conditions of controlling the condition of combustion in the cylinders adjacent to respective end portions of the crankshaft are set on the basis of properties of vibration of the engine and resonant frequencies at the respective end portions of the crankshaft and the conditions of combustion in the respective cylinders are controlled on the basis of the vibration control conditions set for the respective cylinders.

DESCRIPTION OF THE PREFERRED EMBODIMENT

Figure 1:
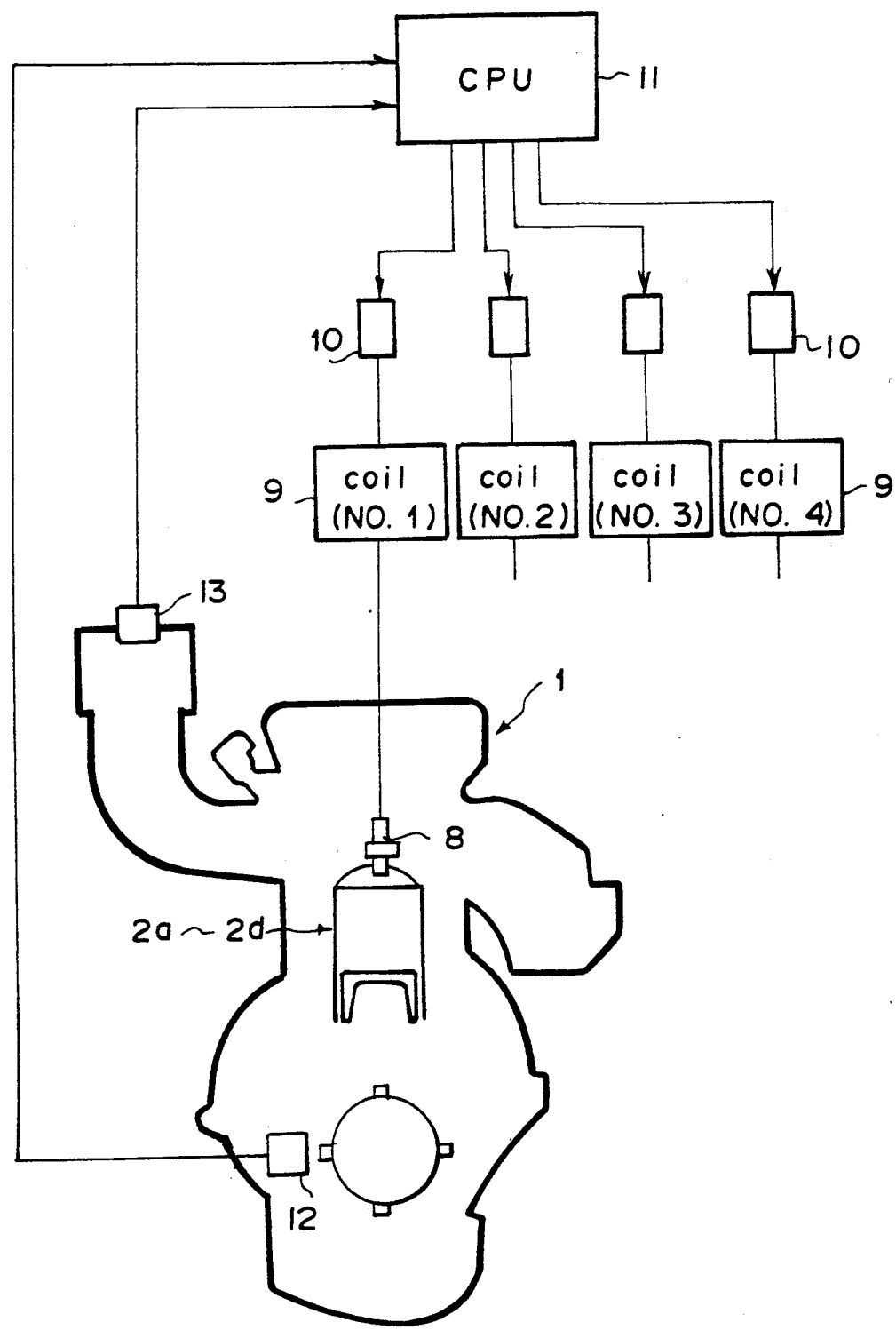
FIG. 1 is a schematic view showing an engine to which a method in accordance with an embodiment of the present invention is applied.
Figure 2:
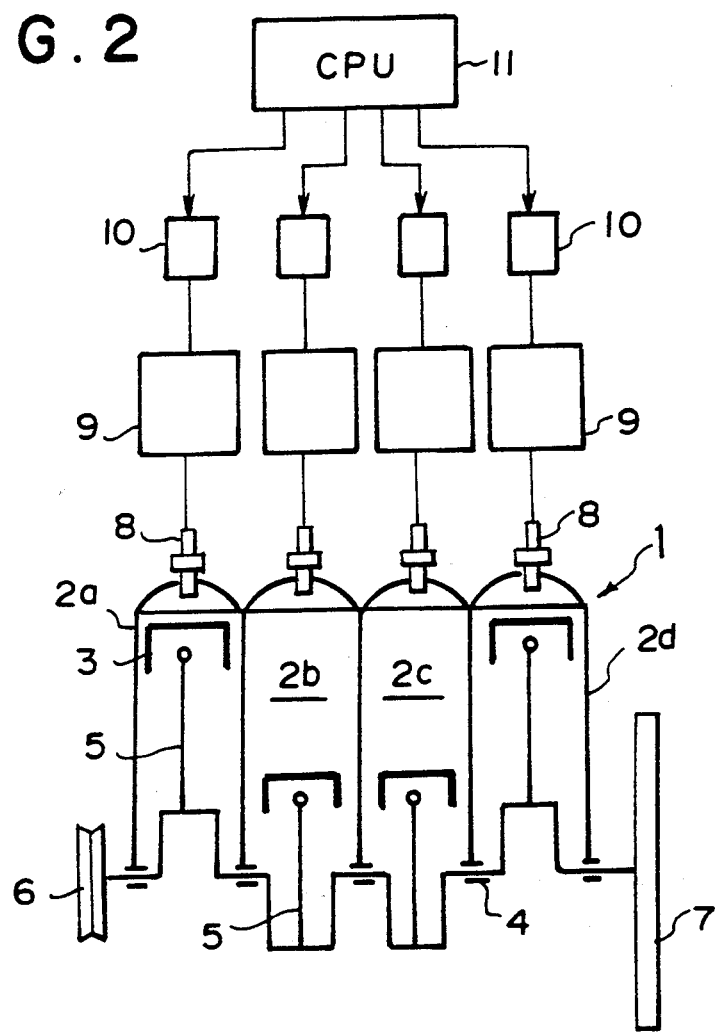
FIG. 2 is a schematic cross-sectional view of the engine.

In FIGS. 1 and 2, an engine 1 has first to fourth cylinders 2a to 2d each having a piston 3 connected to a crankshaft 4 by way of a connecting rod 5. A pulley 6 is mounted on the front end of the crankshaft 4 and a flywheel 7 is mounted on the rear end of the crankshaft 4.

The cylinders 2a to 2d are respectively provided with spark plugs 6 each connected to an ignition coil 9 and an ignitor 10.

A control unit 11 outputs control signals to the respective ignitors 10 and controls the ignition timings of the respective cylinders 2a to 2d according to the crank angle detected by a crank angle sensor 12, the engine speed which is calculated on the basis of the signal from the crank angle sensor 12, the amount of intake air detected by an airflow meter 13 and the like.

In accordance with an embodiment of the present invention, the engine 1 is controlled in the following manner.

That is, vibration control conditions are preset for the front most cylinder, i.e., the first cylinder 2a, on the basis of the resonant frequency at the front end of the engine 1 and the properties of vibration of the engine 1, and vibration control conditions are preset for the rearmost cylinder, i.e., the fourth cylinder 2D, on the basis of the resonant frequency at the rear end of the engine 1 and the properties of vibration of the engine 1. The former will be referred to as "the front vibration control conditions" and the latter will be referred to as "the rear vibration control conditions", hereinbelow. The vibration control conditions are stored in the control unit 11. The control unit 11 controls the conditions of combustion in the first and fourth cylinders 2a and 2d on the basis of the front and rear vibration control conditions, respectively. In this particular embodiment, the control unit 11 controls the condition of combustion in each cylinder by controlling the ignition timing. As the vibration control conditions, a vibration control range in which the vibration control is to be effected is set on the basis of the resonant frequency and the properties of vibration of the engine 1, and a controlled variable (the crank angle of retardation of the ignition timing) is set on the engine load or the like.

Figure 3:
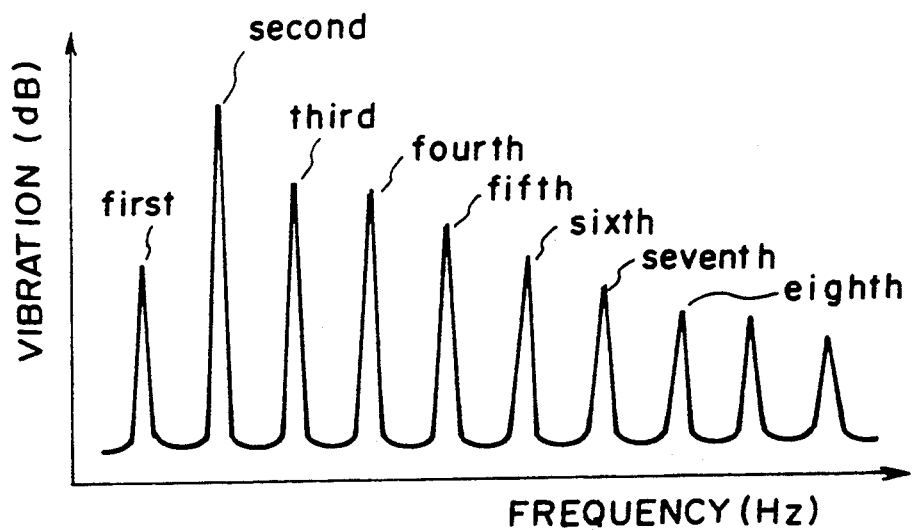
FIG. 3 is a view showing the distribution of the various components of vibration of the engine.
Figure 4:
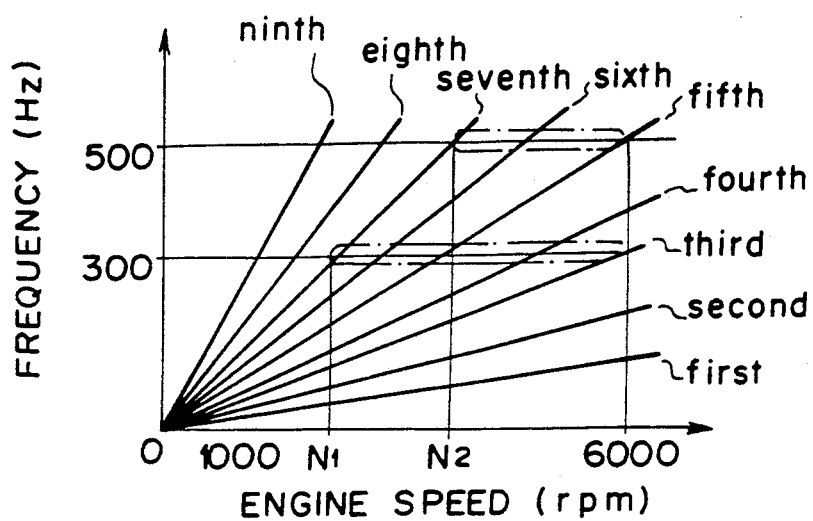
FIG. 4 is a view showing the relation between the frequencies of the various components of vibration of the engine and the engine speed.
Figure 5:
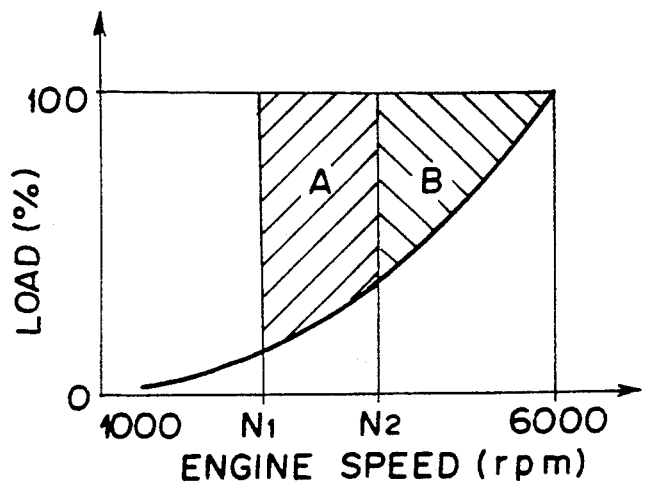
FIG. 5 is a view for illustrating the manner of setting the vibration control ranges.

Setting of the vibration control range will be described with reference to FIGS. 3 to 5, hereinbelow. The vibration of the engine 1 in itself produced by combustion in the cylinders includes a plurality of modes of components as shown in FIG. 3. Out of these components, those which are apt to be sources of noise on the basis of tone and intensity are limited normally to second to seventh mode components. The relations between the engine speeds and the frequencies of the components are as shown in FIG. 4. As can be seen from FIG. 4, the frequency differs from component to component and the frequency of a given component increase with increase in the engine speed. The resonant frequencies at the front and rear ends of the crankshaft 4 depend on the inertial masses of the pulley 6 and flywheel 7 and the like and differ from each other, the former being about 500Hz and the latter being about 300Hz, for instance. In the normal engine speed range (e.g., not higher than 6000rpm), the noise is enlarged in the range where the second to seventh mode components of vibration conform to the resonant frequencies, that is, in the range not lower than engine speed N2 for the resonant frequency at the front end of the crankshaft 4 and in the range not lower than engine speed N1 for the resonant frequency at the rear end of the crankshaft 4, N1 being lower than N2.

Accordingly, in this embodiment, the range where the engine speed is not lower than the engine speed N1 and lower than the engine speed N2 and the engine load is above the road-load line is set as a first vibration control range A where the vibration control is effected only on the fourth cylinder 2d and the range where the engine speed is not lower than the engine speed N2 is set as a second vibration control range B where the vibration control is effected on both the first cylinder 2a and the fourth cylinder 2d.

The control unit 11 adopts basic ignition timings for the respective cylinders 2a to 2d which is determined according to the operating condition of the engine as final ignition timings for the respective cylinders 2a to 2d in the range other than the first and second vibration control ranges A and B. On the other hand, in the first vibration control range A, the control unit 11 retards the ignition timing for the fourth cylinder 2d from the basic ignition timing and in the second vibration control range, the control unit 11 retards the ignition timings for both the first and fourth cylinders 2a and 2d from the respective basic ignition timings.

Figure 6:
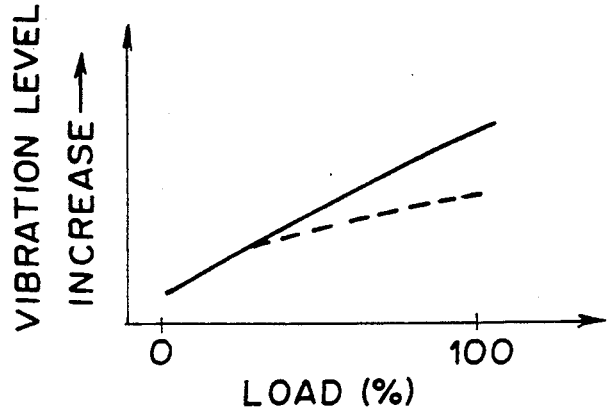
FIG. 6 is a view showing the relation between engine load and the vibration level.

Further, since the vibration level tends to increase as the engine load increases as shown by the solid line in FIG. 6, the control unit 11 increases the retarding crank angle (by which the ignition timing is retarded) for the fourth cylinder 2d in the first vibration control range A and the retarding crank angles for the first and fourth cylinders 2a and 2d with increase in the engine load in order to suppress vibration in the heavy engine load range as shown by the broken line in FIG. 6.

In this particular embodiment, in order to compensate for reduction in the engine output power due to retardation of the ignition timing for the fourth cylinder 2d and/or the first cylinder 2a, the ignition timing for the third cylinder 2c is advanced in the first vibration control range A and the ignition timings for both the second and third cylinders 2b and 2c are advanced in the second vibration control range B.

The control by the control unit 11 described above will be described with reference to the flow chart shown in FIG. 7, hereinbelow.

Figure 7:
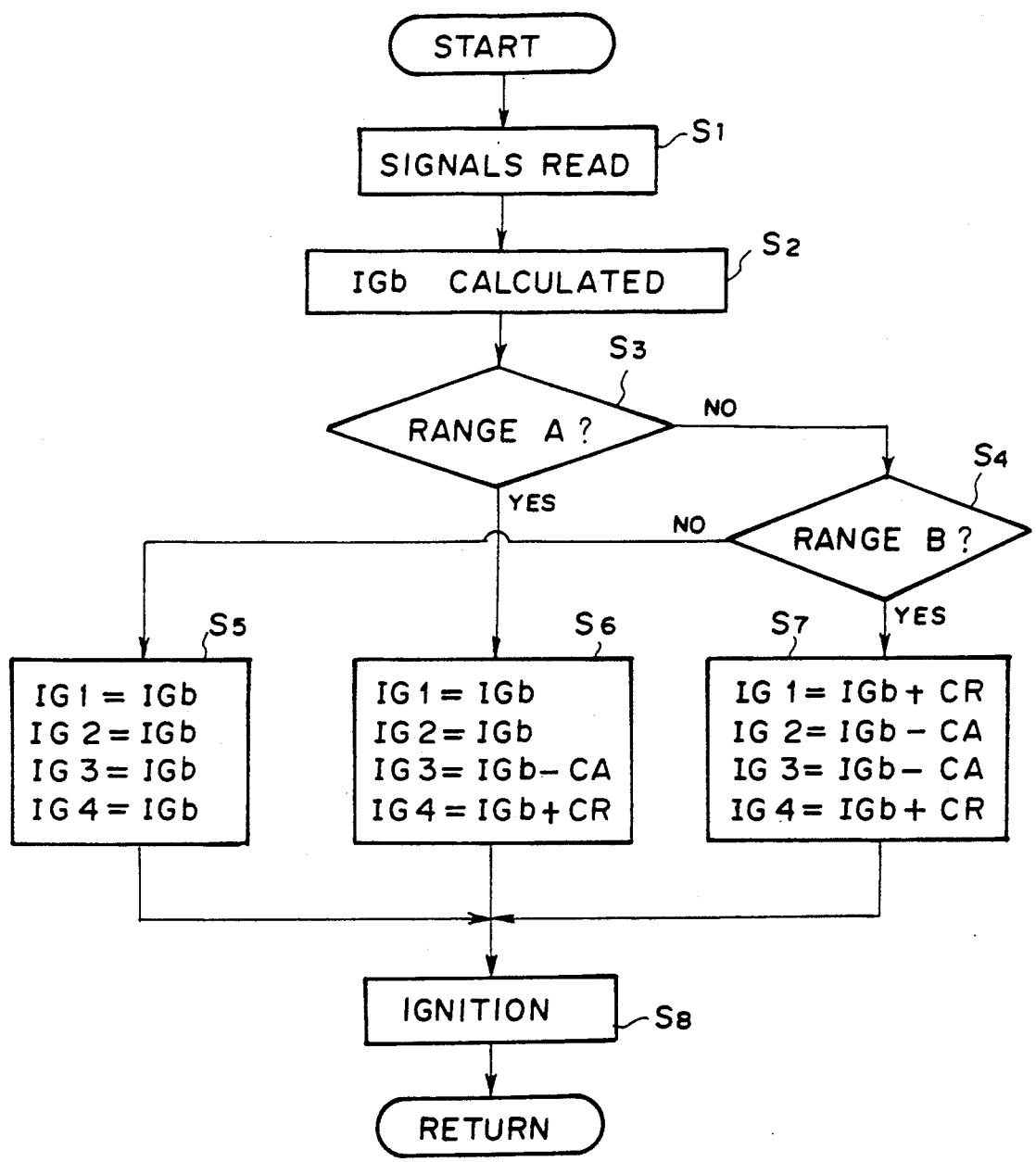
FIG. 7 is a flow chart for controlling the ignition timings.

In FIG. 7, the control unit 11 first reads signals described above and calculates the basic ignition timings IGb for the respective cylinders 2a to 2d according to the operating condition of the engine (e.g., the engine speed and the amount of intake air) with reference to a map stored therein. (steps S1 and S2) Then the control unit 11 determines in step S3 whether the operating condition of the engine is in the first vibration control range A on the basis of the engine speed and the engine load (throttle opening). When it is determined that the operating condition of the engine is not in the first vibration control range A, the control unit 11 further determines whether the operating condition of the engine is in the second vibration control range B. (step S4) When it is determined in step S4 that the operating condition of the engine is not in the second vibration control range B, that is, when it is determined that the operating condition of the engine is neither in the first vibration control range A nor in the second vibration control range B, the control unit 11 adopts the basic ignition timings IGb for the respective cylinders 2a to 2d as the ignition timings IG1, IG2, IG3 and IG4 for the respective cylinders 2a to 2d. (step S5)

When it is determined in step S3 that the operating condition of the engine is in the first vibration control range A, the control unit 11 adopts the basic ignition timings IGb as the ignition timings IG1 and IG2 for the first and second cylinders 2a and 2b, the value advanced from the basic ignition timing IGb by a correction value CA as the ignition timing IG3 for the third cylinder 2c, and the value retarded from the basic ignition timing IGb by a correction value CR as the ignition timing IG4 for the fourth cylinder 2d. (step S6)

When it is determined in step S4 that the operating condition of the engine is in the second vibration control range B, the control unit 11 adopts the values advanced from the basic ignition timings IGb by the correction value CA as the ignition timings IG2 and IG3 for the second and third cylinders 2b and 2c, and the values retarded from the basic ignition timings IGb by the correction value CR as the ignition timings IG1 and IG4 for the first and fourth cylinders 2a and 2d. (step S7) The correction values CA and CR are set according to the engine load and the like and is increased with increase in the engine load.

Then the control unit 11 outputs signals representing the ignition timings IG1 to IG4 for the respective cylinders 2a to 2d which has been determined in step S5, S6 or S7.

In accordance with the control described above, the ignition timings for the first and fourth cylinders 2a and 2d are retarded in the second vibration control range B where the noise is apt to be produced due to resonances at both the front and rear ends of the crankshaft 4. When the ignition timings for the cylinders 2a and 2d are retarded, the combustion pressures in the cylinders are lowered and retardation of the time at which the combustion pressure in each cylinder is maximized (the crank angle after TDC) is enlarged, whereby the force component directed toward the axis of the crankshaft 4 is reduced and the bending strains of the crankshaft 4 at the front and rear ends are reduced. Thus the noise is suppressed. Generally the basic ignition timing is retarded from the crank angle at which the output torque is maximized, and accordingly, when the ignition timings for the second and third cylinders 2b and 2c in the first vibration control range B, the output powers of the second and third cylinders are increased, thereby compensating for the reduction in the output power of the first and fourth cylinders 2a and 2d due to the retardation of the ignition timing.

In the first vibration control range A where the noise is apt to be produced due to a resonance only at the rear end of the crankshaft 4, only the ignition timing for the fourth cylinder 2d is retarded and the ignition timing for the first cylinder 2a is not retarded. The reduction in the output power of the fourth cylinder 2d is compensated for by advancing the ignition timing for the third cylinder 2c.

In the range other than the first and second vibration control ranges A and B, the ignition timing for any of the cylinders is not retarded since the second to seventh mode components do not conform to the resonant frequency at the front end or the rear end.

Figure 8:
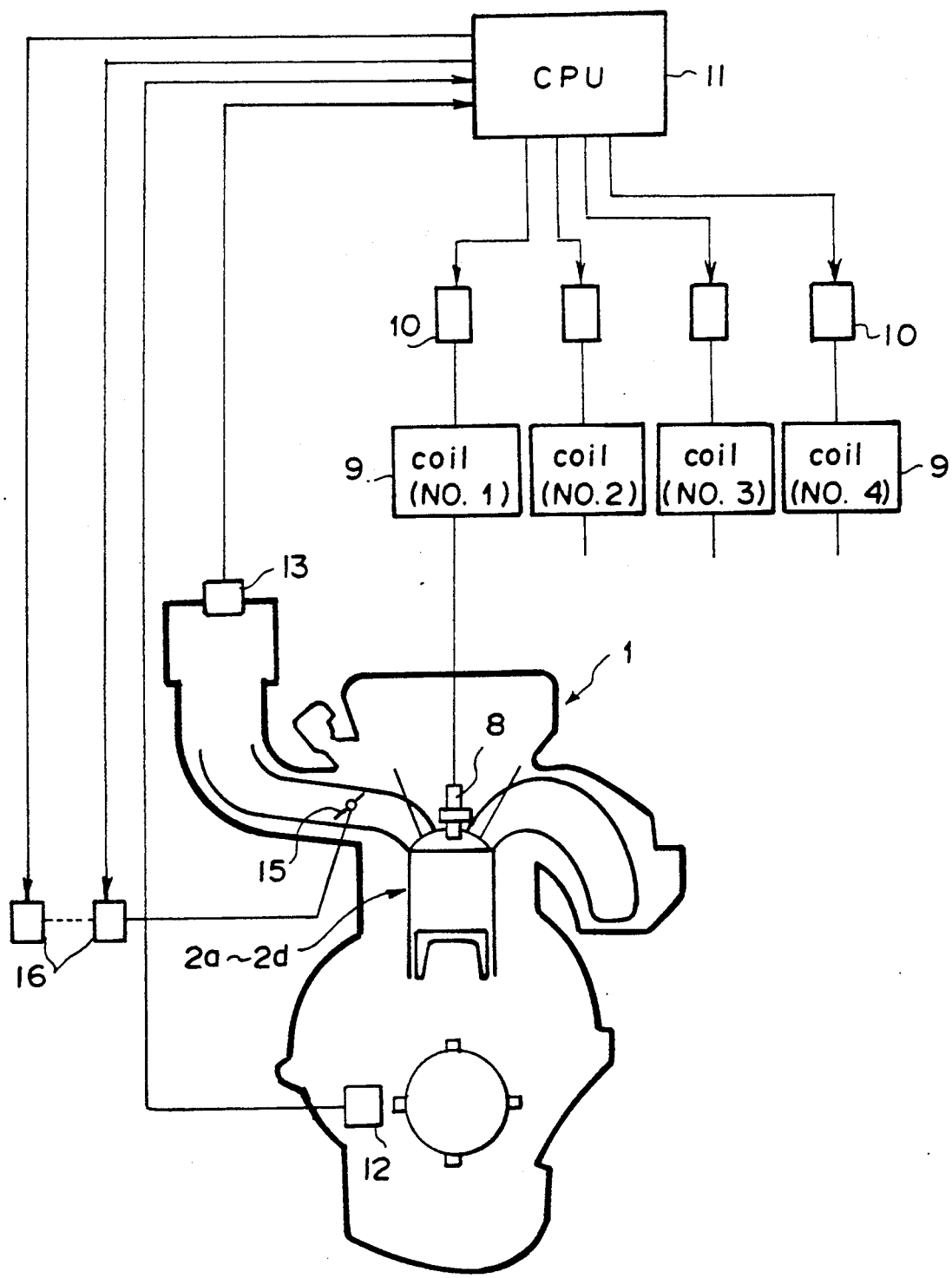
FIG. 8 is a view similar to FIG. 1 but showing an engine to which a method in accordance with another embodiment of the present invention.
Figure 9A:
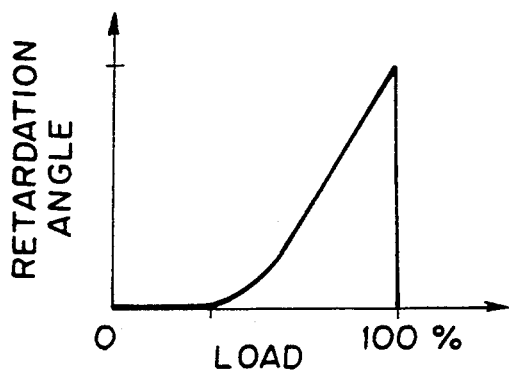
FIG. 9A is a view showing the relation between the angle of retardation of the ignition timing and the engine load.
Figure 9B:
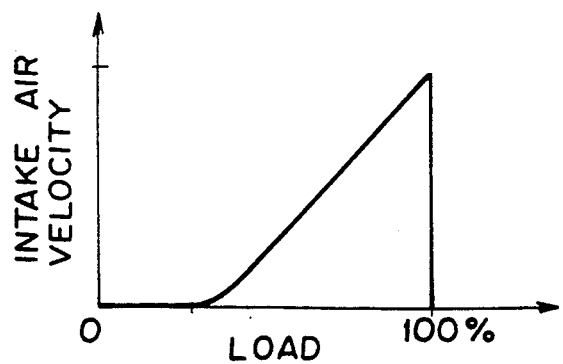
FIG. 9B is a view showing the relation between the velocity of intake air and the engine load.

Another embodiment of the present invention will be described with reference to FIGS. 8 to 10, hereinbelow. In this embodiment, the ignition timings for the fourth cylinder 2d is retarded in the first vibration control range A and the ignition timings for both the first and fourth cylinders 2a and 2d are retarded in the second vibration control range B as in the previous embodiment. However, in this embodiment, the reduction in the output power due to retardation of the ignition timing is compensated for by increasing the velocity of intake air instead of advancing the ignition timings for the other cylinders. That is, as shown in FIG. 8, a swirl control valve 15 is provided with each of the intake passages for the respective cylinders 2a and 2d and is actuated by an actuator 16 under the control of the control unit 11. In the first vibration control range A, the control unit 11 retards the ignition timing for the fourth cylinder 2d and at the same time causes the actuator 16 for the fourth cylinder 2d to move the swirl control valve 15 in the direction in which the velocity of intake air is increased. In the second vibration control range B, the control unit 11 retards the ignition timings for the first and fourth cylinders 2a and 2d and at the same time causes the actuators 16 for the first and fourth cylinders 2a and 2d to move the swirl control valves 15 in the direction in which the velocity of intake air is increased. As the engine load increases, the angle of retardation is increased as shown in FIG. 9A and the velocity of intake air is increased as shown in FIG. 9B.

Figure 10:
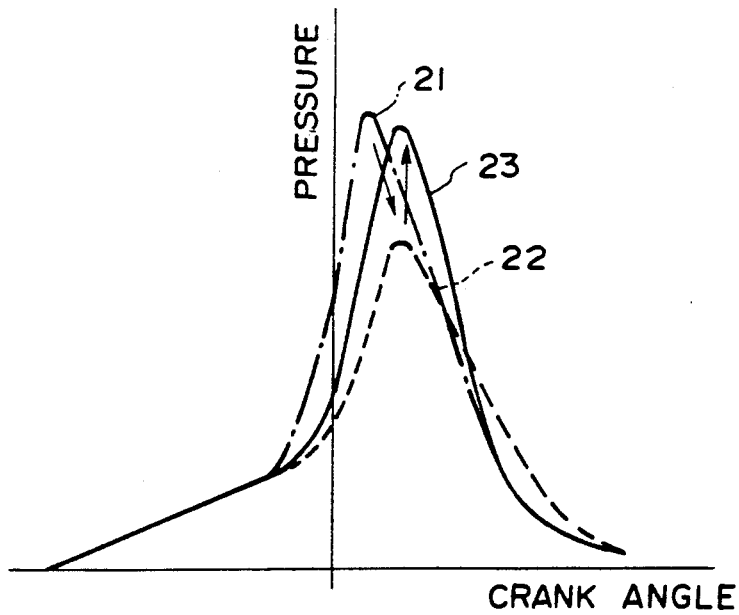
FIG. 10 is a view for illustrating the effect of the ignition timing retardation on the combustion pressure and the effect of increase in the intake air velocity on the combustion pressure.

In FIG. 10, chained line 21 shows the change in combustion pressure in a cylinder when the ignition timing is the basic ignition timing, and broken line 22 shows that when the ignition timing is retarded. As can be understood by comparison of the lines 21 and 22, the combustion pressure is lowered when the ignition timing is retarded. When the velocity of intake air is increased and the swirl of intake air is enhanced, the combustion pressure is increased as shown by solid line 23 in FIG. 10, whereby reduction of the output power is suppressed. In this embodiment, even if the combustion pressure is high, the force component directed toward the axis of the crankshaft 4 is reduced by virtue of retardation of the ignition timing, whereby noise is suppressed.

We claim:

1. A method of controlling an engine to suppress vibration of the engine, the engine having a crankshaft and a plurality of cylinders arranged in a row in a direction parallel to the crankshaft, the method comprising the step of controlling the condition of combustion in the cylinder adjacent to one end portion of the crankshaft to suppress bending strain of the crankshaft at said one end portion wherein the improvement comprises that vibration control conditions of controlling the conditions of combustion in the cylinders adjacent to respective end portions of the crankshaft are set on the basis of properties of vibration of the engine and resonant frequencies at the respective end portions of the crankshaft and the conditions of combustion in the respective cylinders are controlled on the basis of the vibration control conditions set for the respective cylinders.

2. A method as defined in claim 1 in which the ignition timing for each of said cylinders is retarded in order to suppress the bending strain of the crankshaft at the corresponding end portion of the crankshaft, and said vibration control conditions include the operating range of the engine in which the ignition timing for each of the cylinders is to be retarded and the crank angle by which the ignition timing is retarded.

3. A method as defined in claim 2 in which said operating range of the engine in which the ignition timing for each of the cylinders is to be retarded is the range in which second to seventh mode of components of vibration of the engine conforms to the resonant frequency at the corresponding end portion of the crankshaft.

4. A method as defined in claim 3 in which said crank angle by which the ignition timing is retarded is increased with increase in the engine load.

5. A method as defined in claim 4 in which the ignition timing for the cylinder adjacent to each of said cylinders adjacent to the respective end portions of the crankshaft is advanced when the ignition timing for each of said cylinders adjacent to the respective end portions of the crankshaft is retarded.

6. A method as defined in claim 4 in which the velocity of intake air introduced into each of said cylinders adjacent to the respective end portions of the crankshaft is increased when the ignition timing for the cylinder is retarded.

* * * * *